US012552995B2

(12) United States Patent

Staack et al.

(10) Patent No.: US 12,552,995 B2
(45) Date of Patent: Feb. 17, 2026

(54) HYDROCARBON CONVERSION TO LIQUID FUEL BY HIGH-ENERGY ELECTRON BEAM IRRADIATION

(71) Applicant: The Texas A&M University System, College Station, TX (US)

(72) Inventors: David Staack, College Station, TX (US); Kunpeng Wang, College Station, TX (US)

(73) Assignee: The Texas A&M University System, College Station, TX (US)

( * ) Notice: Subject to any disclaimer, the term of this patent is extended or adjusted under 35 U.S.C. 154(b) by 1075 days.

(21) Appl. No.: 17/625,552

(22) PCT Filed: Jul. 10, 2020

(86) PCT No.: PCT/US2020/041680
§ 371 (c)(1),
(2) Date: Jan. 7, 2022

(87) PCT Pub. No.: WO2021/007550
PCT Pub. Date: Jan. 14, 2021

(65) Prior Publication Data

US 2022/0259503 A1 Aug. 18, 2022

Related U.S. Application Data

(60) Provisional application No. 62/872,765, filed on Jul. 11, 2019.

(51) Int. Cl.
*C10G 5/06* (2006.01)
*B01J 19/08* (2006.01)

(52) U.S. Cl.
CPC .............. *C10G 5/06* (2013.01); *B01J 19/085* (2013.01)

(58) Field of Classification Search
CPC .... C10G 5/06; C10G 32/04; C10G 2300/305; B01J 19/085; B01J 2219/0875;
(Continued)

(56) References Cited

U.S. PATENT DOCUMENTS 9,985,299 B1 * 5/2018 Bar-Gadda .......... H01M 8/0202
2003/0233019 A1 12/2003 Sherwood
(Continued)

OTHER PUBLICATIONS

Foreign Search Report on PCT PCT/US2020/041680 Dtd Oct. 8, 2020.

*Primary Examiner* — Xiuyu Tai
(74) *Attorney, Agent, or Firm* — Foley & Lardner LLP

(57) ABSTRACT

Hydrocarbon conversion and transportation methods and apparatuses are provided. An apparatus may apply electron beam irradiation to hydrocarbons (i.e., natural gas) to convert the hydrocarbons to liquid fuel. Lower-weight hydrocarbons may be converted into medium-weight organics through a gas to liquid process (GTL). The electrons may generate radicals that facilitate desired reactions. The hydrocarbons may be temperature and pressure controlled. For example, the hydrocarbons may be at lower temperatures (e.g., cryogenic or otherwise below ambient) and/or at higher pressures (e.g., greater than standard atmospheric pressures). Temperature suppression may reduce decomposition reactions. A high energy electron beam (e.g., 500 keV or higher, such as 10 MeV) could be used for the conversion process. The hydrocarbon may be liquefied. The liquid-like, higher density lower-weight hydrocarbons may lead to radical-neutral interactions. The high-energy electrons may penetrate the liquid hydrocarbon, treating more than just the surface of the liquid hydrocarbon.

20 Claims, 11 Drawing Sheets

(58) Field of Classification Search
CPC .... C10L 1/06; C10L 2290/06; C10L 2290/10; C10L 2290/543; C10L 2290/36; C10L 2290/542; C10L 2290/24; C10L 2290/60; C10L 2270/023; C10L 2290/548; C10L 10/10; C07C 2/80; C07C 9/14; Y02P 20/129; F01D 15/005; F01D 15/02; F02C 6/06; F02C 7/22; F02C 6/20; F25J 1/0022; F25J 1/005; F25J 1/007; F25J 1/0204; F25J 1/0221; F25J 1/023; F25J 1/0251; F25J 1/0275; F25J 1/0283; F25J 2210/40; F25J 2230/22; F25J 2230/30; F25J 2240/10; F25J 2240/80; F25J 2270/14
See application file for complete search history.

(56) References Cited

U.S. PATENT DOCUMENTS

2014/0165587 A1* 6/2014 Foege .................. F01D 15/005 60/734
2015/0232395 A1 8/2015 Nyce et al.
2019/0136391 A1 5/2019 Britt et al.
2019/0151816 A1 5/2019 Day et al.
2019/0316294 A1* 10/2019 Medoff .................... C10G 1/02

* cited by examiner

A

B

A

B

C

D

A

B

A

B 21 shielding structure
22 stirring rod
23 chilled or high pressure feedstock inlet
24 treatment reactor chamber
25 electron beam aperture and window
26 product outlet

HYDROCARBON CONVERSION TO LIQUID FUEL BY HIGH-ENERGY ELECTRON BEAM IRRADIATION

CROSS REFERENCE TO RELATED APPLICATION

This application is a national stage application under 35 U.S.C. § 371 of International Application No. PCT/US2020/041680, filed on Jul. 10, 2020, which claims the benefit of U.S. Provisional Patent Application No. 62/872,765, filed on Jul. 11, 2019, the contents of each of which are incorporated by reference herein in [its] their entirety.

FIELD

Illustrative embodiments of the present disclosure relate generally to the conversion of hydrocarbons, such as natural gas or other lower-weight hydrocarbons, into liquid fuels, such as gasoline or diesel fuel, via electron-beam (ebeam) irradiation.

BACKGROUND

Natural gas, a relatively clean and abundant fossil fuel, has lower carbon emissions and fewer impurities compared to other fuels. However, its market share among all energy resources is low relative to its reserves and quality because of poor transportability and safety concerns. There is a need in the art for methods and apparatuses to facilitate transformation of natural gas into transportable and storable fuels. The present disclosure satisfies this and other needs.

SUMMARY

One aspect of the invention provides an apparatus for electron beam irradiation of hydrocarbon (i.e., natural gas) to convert the hydrocarbon to liquid fuel.

Another aspect of the invention, provides a method for converting a hydrocarbon into a liquid fuel, the method including irradiating the hydrocarbon with an electron beam to form a liquid fuel therefrom. Typically, previous attempts to irradiate natural gas or light hydrocarbons resulted in a major product of hydrogen. The present method selectively produces heavier hydrocarbons and liquid fuels. This major difference results in part from the fact that the feed stock is high density (by liquification, cooling or high pressure).

In various embodiments of the disclosure, hydrocarbons, such as natural gas or other lower-weight hydrocarbons, may be converted into medium-weight organics, such as high-quality liquid products (e.g., gasoline and diesel fuel) through a gas to liquid process (GTL). The hydrocarbons may be irradiated with an electron beam. The electrons may generate radicals that facilitate desired reactions. The hydrocarbons may be temperature and pressure controlled. For example, the hydrocarbons may be at lower temperatures (e.g., cryogenic or otherwise below ambient) and/or at higher pressures (e.g., greater than standard atmospheric pressures). The specific selection of beam parameters, operating temperature and pressure enhances the product selectivity to form liquid fuels from lighter hydrocarbons. Temperature suppression may reduce decomposition reactions. A high energy electron beam (e.g., 500 keV or higher, such as 10 MeV) could be used for the conversion process. A wide range of beam energy may be acceptable and can be tailored in design to specific applications (e.g., low energy for small skid based, transportable, or truck based units, and high energy for larger fixed infrastructure). The processed hydrocarbon may be liquefied. The liquid-like, higher density lower-weight hydrocarbons may lead to radical-neutral interactions. The high-energy electrons may penetrate the liquid hydrocarbon, treating more than just the surface of the liquid hydrocarbon. Various nano-particulate or micro-particulate additives (e.g., 0.1% bromine or nickel nanoparticles) may be used to aid the conversion process.

Non-limiting examples of various embodiments are disclosed herein. Additional non-limiting features and details can be found in the detailed description below.

BRIEF DESCRIPTION OF THE DRAWINGS

FIG. 5A shows the pentane before irradiation and FIG. 5B shows the pentane after irradiation according to various potential embodiments.

DETAILED DESCRIPTION

Figure 1:
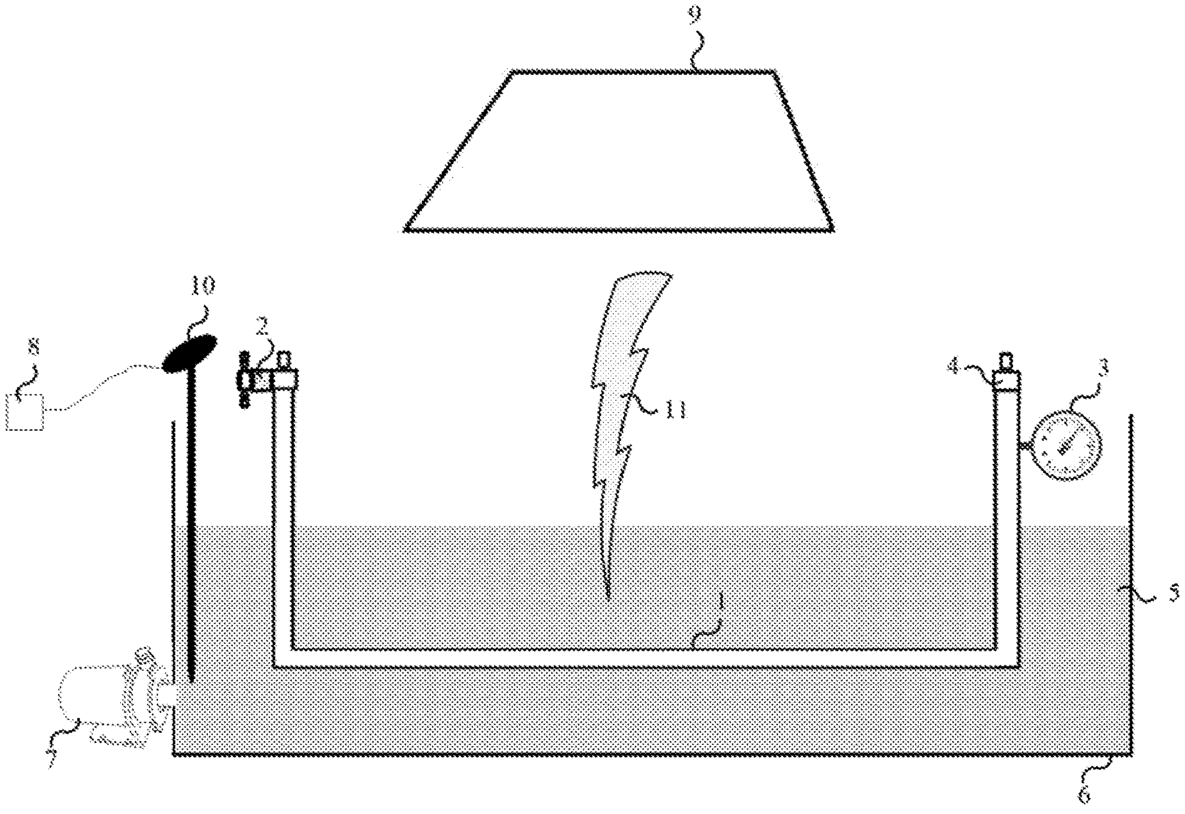
FIG. 1 illustrates an apparatus for irradiating hydrocarbons according to various potential embodiments.

Permanently converting gaseous naturally occurring hydrocarbons (e.g., methane, ethane, propane, and butane) to liquid fuels would, for example, greatly improve their transportability. This process is referred to as Gas to Liquids (GTL). Such chemical conversion can occur through a crosslinking process. For natural gas crosslinking to chain length of N=2 to N=5 would produce condensed liquids at ambient temperatures and pressures. Irradiation of hydrocarbons for crosslinking of monomers can be very inefficient. Typically, irradiation of light hydrocarbons results in a majority of reactions being chain scission and not crosslinking. Embodiments of the disclosure relate to a method of increasing the yield and efficiency of light hydrocarbon crosslink. This may be done by irradiating the natural gas in a high density state. The natural gas could be high pressure or low temperate (or a combination of both) to bring the density to levels comparable to the liquid or solid density. Currently, natural gasses are routinely cryogenically liquefied (called Liquified Natural Gas—LNG) to ease transportation but this liquification is temporary. Embodiments of the disclosed approach permanently convert the natural gas to a liquid by irradiation chemistry. GTL is permanent, LNG is temporary.

During irradiation radicals are generated and a polymerization chain reaction is initiated. One radical can lead several chain formation. Irradiation of natural gas by high energy electron beam at high density state can be used to convert natural gas to liquid fuels such as gasoline or diesel. Depending on the processing states and the addition of promoters the conversion can vary significantly. With irradiation at high density states and the addition of promoters, the conversion may be enhanced. Irradiation at high density is unique in that the radical species is very short lived and will react with natural species prior to being further excited. In low density processing multiple excitation would lead to excessive decomposition, carbon nucleation, and yield of nano- and micro-particulate formation. Irradiation of natural gas at condensed state can help to significantly increase the probability of radical induced reactions which lead to higher conversion to liquid products. In various embodiments, for the condensed hydrocarbon, conversions will be the highest (or at least enhanced) when above the glass transition temperature and best when above the melting temperature but below the boiling temperature. In various embodiments, the processing states are carefully selected but may have the most beneficial effects combined with the use of additives and a narrow range of energy input. This gas to liquid conversion process by high energy electron beam irradiation approach is applicable to, for example, natural gas conversion to liquid fuels for better transportation, and the product can also be used, for example, to produce diluent to help heavy crude oil transportation.

Such a gas to liquid conversion process could be used to permanently convert natural gas to liquid fuels such as gasoline or diesel. Liquid fuels have better transportability and less safety concerns. A high energy electron beam facility could be used as the energy source to achieve the GTL goal.

The synthetic diluent produced by such a GTL process may be significantly more valuable than natural gas. In various implementations of the disclosed approach, an electron beam irradiation facility may be located at a natural gas well or at a heavy crude well which is co-producing natural gas. A gas to liquid conversion unit may be built into a continuous flow system (FIG. 8) of natural gas so that natural gas can be processed as it flows from the source 12 through the reactor 1. This could be located near the production well on the oil field upstream of the transportation pipeline. Produced fuels may be transported or shipped. The products could also be used as diluent to mix with crude oils before they can be transported by pipe lines. The product could be used for direct diluent sale or to dilute the heavy-crude and increase its value. A 40 kW electron beam, for example, may be able to process, for example, about 0.5 million cubic feet (MMcf) per day of natural gas. Diluent and gasoline range organics typically are valued significantly higher than natural gas.

Figure 9:
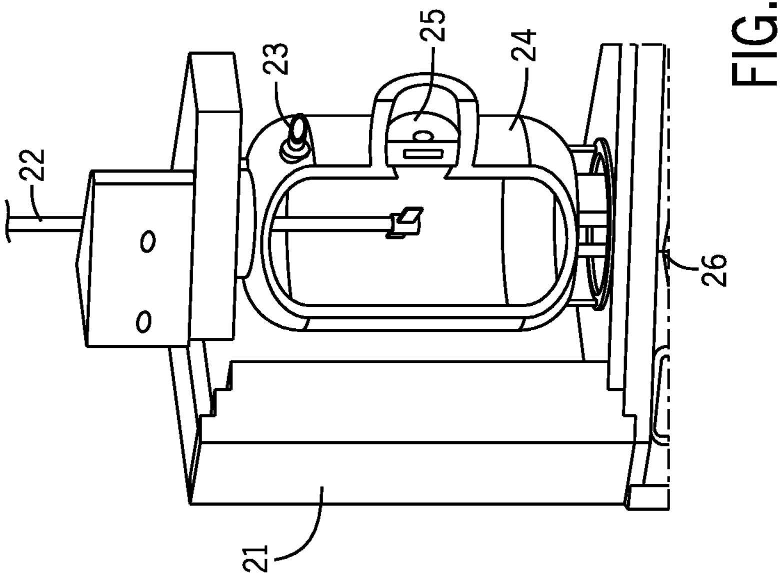
FIG. 9 is a schematic of an example continuous flow system for processing a hydrocarbon in a continuous stirred tank reactor configuration with an electron beam window interface according to various potential embodiments.

The reactor may be configured as a continuously stirred tank reactor (CSTR) as shown in FIG. 9. The reactor may include aluminum or other low density material acting as interface between the electron beam source and the processing chamber. A shielding structure 21 may, at times, be positioned to shield treatment reactor chamber 24 from electron beam. Stirring rod 22 which extends into the reactor is used to stir reactor liquid contents. A feedstock inlet 23 may be used to introduce hydrocarbon or natural gas into the treatment reactor chamber 24. Treatment reactor chamber 24 may include electron-beam aperture and window 25 through which electron-beam is passed to interact with reactor contents. Product outlet 26 provides an exit for the product liquid fuels. In some embodiments, feedstock is converted to product in a single pass. The feed is at appropriate density for processing on introduction into the system. The tank reactor pressure and temperature is maintained at specified condition to favor permanent conversion to liquid products. An electron beam window sits at the interface between the CSTR and electron beam source. This window is designed to handle the pressure and temperature gradients between the processing tank and electron beam generator environment. This window can be made from a very thin material or from low atomic number and low-density materials to provide more efficient transfer of the electron to the processing chamber. Example window materials could include, titanium foils, aluminum foils, tantalum foils, gridded micro-structured silicon panes, and/or diamond foils. The stirring rod in the CSTR is at such distance from the window such that the beam energy is not lost on the stirring rod. The beam may enter the chamber from the side such that particulate waste formed falls to the bottom of the tank and not onto the beam window. The beam may enter from the side such that any hydrogen or other gaseous product may rise to the top of the reactor and not be trapped onto the beam window. The system as is typical of electron beam sources is shielded to prevent exposure of scattered x-rays to surrounding personnel. This shielding may be intentionally manufacture concrete, steel, lead or other surrounds. The shielding may also be dirt, water, coolant, feedstock or product liquids or any other material of sufficient thickness to safety shield the system.

Examples of additional benefits of such a gas to liquid conversion approach include the following. First, natural gas conversion to liquid fuels is advantageous due to the ease of transportability and safety of a liquid fuel vs. natural gas. Second, environmental impacts due to natural gas emission will be mitigated due to conversion of natural gas to liquid fuels. The disclosed approach generally helps increase the utilization efficiency of natural gas or reduce its impact on the environment. This specific gas to liquid conversion approach may allow for a diversified energy supply for many regions where crude oil is the only energy source.

Embodiments of the disclosed approach involve irradiating gas (i.e., natural gas) in a high density state. This can greatly increase the product yield of gasoline range hydrocarbons. The disclosed approach may use a high energy electron beam to convert natural gas to liquid fuels. The use of high energy electron beam and irradiation of natural gas at condensed states is energy efficient and provides high yields of longer hydrocarbons compounds. The conversion may involve creation of hydrocarbon radicals by collisions with high speed electrons. Additives such as longer chain hydrocarbons or polymer crosslinking promoters may be used to promote the conversion process. Promoters might include tailored additive, for example, triallyl isocyanurate optionally at 0.1 wt/wt % can be can greatly amplify crosslinking reactivity. Other promoters which are less effective but less costly such as irradiation products (for example polyolefins) can be partially recycled into the feed stream at, for example, 1%-5% to promote crosslinking. Also, petroporphyrins, micro and nanoparticles such as iron, nickel, aluminum and/or other metal microparticles can serve as activation and catalyst sites for cross linking reactions. Particles at small weight percent can be easily separated and recycled.

In various implementations, other hydrocarbons, such as propane, may be used as a substitute for natural gas, and may be irradiated at condensed state to produce hydrocarbon products larger than the parent molecule. Gasoline or diesel fuels may be produced from this process. Propane, one of the lowest value liquid storable hydrocarbons, and other relatively low-value hydrocarbons such as EPE gas or ethane resources may be converted to high-value fuels such as gasoline or diesel. Potential conversion promoters such as glycidyl methacrylate may be used with the ebeam. Long chain hydrocarbons such as hexadecane or compounds in mineral oil may also be used as promoters. In an example implementation involving propane, a high energy electron beam (10 MeV, LINAC) may be used to irradiate the propane. Promoters (1-5 wt. %) may be mixed with the feed stock before they are irradiated. The reactor may be cooled with a liquid nitrogen bath to keep propane at condensed state. Irradiation may be performed at controlled temperatures (e.g., −188 and −100 degrees ° C.) and pressure (e.g., 5 psig). Irradiation time may be controlled to deliver a specific energy input (e.g., 300-500 kJ/kg).

Referring to FIG. 1, one aspect of the invention provides an apparatus for hydrocarbon (i.e., natural gas) electron beam irradiation including a reactor 1 for charging with hydrocarbon to be irradiated with electron beam 11. The hydrocarbon may be natural gas, for example including methane and optionally one or more of ethane, $C_3$ alkanes, $C_4$ alkanes, carbon dioxide, nitrogen, hydrogen sulfide, and helium. The hydrocarbon may be gaseous at standard temperature and pressure [STP, 273.15° K (0° C., 32° F.) and an absolute pressure of exactly 105 Pa (100 kPa, 1 bar)], or at 1 bar and 22° C. In some embodiments, the reactor 1 includes cooled and/or pressurized hydrocarbon. The cooling and/or pressuring may turn the hydrocarbon from a gas to a liquid state. The hydrocarbon charged into reactor 1 may be cooled by submersion of reactor 1 into a cooling bath 6 including solvent 5. The hydrocarbon may be cooled to a temperature between −250° C. to about −200° C., about −200° C. to about −150° C., about −150° C. to about −100° C., about −100° C. to about −50° C., about −50° C. to about 0° C., or about 0° C. to about 15° C. The temperature may be a temperature between the freezing point and the boiling point of the hydrocarbon. Solvent(s) 5 may comprise acetone, dry ice, water, ethanol, liquid $N_2$, ethyl acetate, butanol, ethylene glycol, methanol, xylene, dioxane, cyclohexane, benzene, formamide, salts (i.e., calcium chloride, sodium chloride, calcium chloride hexahydrate), cycloheptane, benzyl alcohol, Carbon tetrachloride, 1,3-Dichlorobenzene, m-Toluidine, Acetonitrile, Pyridine, Octane, Isopropyl ether, Hexane, Toluene, Cyclohexene, pentane, and combinations thereof. Temperature of solvent 5 may be monitored by thermocouple 10 connected to power source 8. Cooling bath 6 may include solvent pump 7 attached thereto for delivery of solvent 5 to cooling bath 6. In embodiments, pump 7 circulates water into and out of cooling bath 6. Said circulated water may be temperature conditioned externally to cooling bath 6.

In some embodiments, the reactor 1 includes hydrocarbon at pressure. In some embodiments, the hydrocarbon may be pressurized to a pressure of about 1 psig to about 2 psig, about 2 psig to about 3 psig, about 3 psig to about 4 psig, about 4 psig to about 5 psig, about 5 psig to about 6 psig, about 6 psig to about 7 psig, about 8 psig to about 9 psig, about 9 psig to about 10 psig, or about greater than 10 psig, or about greater than 150 psi, or about greater than 4000 psi. The reactor may be charged with hydrocarbon and auxiliary gas via valve 2. A multi-stage and/or multiphase compressor or similar device may be used to bring feedstock to high pressure. Alternatively the reactor may comprise substantially only hydrocarbon at pressure. Pressure gauge 3 displays pressure inside reactor 1. Pressure release 4 may be configured to release reactor 1 contents (i.e., hydrocarbon and optionally auxiliary gas) when reactor pressure increases past a specific pressure of about 1 psig to about 2 psig, about 2 psig to about 3 psig, about 3 psig to about 4 psig, about 4 psig to about 5 psig, about 5 psig to about 6 psig, about 6 psig to about 7 psig, about 8 psig to about 9 psig, about 9 psig to about 10 psig, or about greater than 10 psig, or about greater than 150 psi, or about greater than 4000 psi. In some embodiments, valve 2 may comprise 1 or more gas-input lines (not illustrated) attached thereto for delivering hydrocarbon and/or auxiliary gas to reactor 1. Valve 2 may include gas-input lines attached thereto to automatically deliver hydrocarbon and/or auxiliary gas if reactor pressure decreases below a specific pressure of about 1 psig to about 2 psig, about 2 psig to about 3 psig, about 3 psig to about 4 psig, about 4 psig to about 5 psig, about 5 psig to about 6 psig, about 6 psig to about 7 psig, about 8 psig to about 9 psig, about 9 psig to about 10 psig, or about greater than 10 psig, or about greater than 150 psi, or about greater than 4000 psi.

The apparatus of FIG. 1 may further include electron beam vault 9 including electron beam source (not shown) configured to deliver electron beam 11 to the hydrocarbon in reactor 1. Electron beam sources may include, but are not limited to, a linear accelerator (LINAC), a rhodotron, a dynamitron, or a DC accelerator. All of these start with a primary source of seed electrons from a cold or thermionic electron emitter and then accelerate the electron to relativistic velocities using DC or AC electric fields including in some cases RF, microwave and other high frequency electromagnetic fields. Any source efficiently producing a stream of highly energetic electrons would suffice. Energy sources for electron beam 11 may include the electrical grid or direct sources of solar, wind, rain, tide, wave, hydropower, geothermal, or a combination thereof. The electron beam may include a dose rate of about 1 kGy/s to about 2 kGy/s, about 2 kGy/s to about 3 kGy/s, about 3 kGy/s to about 4 kGy/s, about 4 kGy/s to about 5 kGy/s, about 5 kGy/s to about 6 kGy/s, about 6 kGy/s to about 7 kGy/s, about 7 kGy/s to about 8 kGy/s, or greater than about 8 kGy/s. The electron beam may about 1 MeV to about 2 MeV, about 2 MeV to about 3 MeV, about 3 MeV to about 4 MeV, about 4 MeV to about 5 MeV, about 5 MeV to about 6 MeV, about 6 MeV to about 7 MeV, about 8 MeV to about 9 MeV, about 9 MeV to about 10 MeV, or about greater than 10 MeV. Specific energy input (SEI) of electron beam 11 may be about 100 kJ/kg to about 200 kJ/kg, about 200 kJ/kg to about 300 kJ/kg, about 300 kJ/kg to about 400 kJ/kg, or about 400 kJ/kg to about 500 kJ/kg, or about 600 kJ/kg to about 700 kJ/kg, or about greater than 700 kJ/kg.

In some embodiments, the liquid fuel produced comprises about 50% to about 60%, about 60% to about 70%, about 70% to about 80% or about 80% to about 99% of the mass inside reactor 1, subsequent to irradiation.

In some embodiments, reactor 1 or reactor 1 and cooling bath 6 may be configured to be movable into and out of electron beam 11. In some embodiments, electron beam vault 9 may be configured to be movable so as to move electron beam 11 out of reactor 1.

Figure 8:
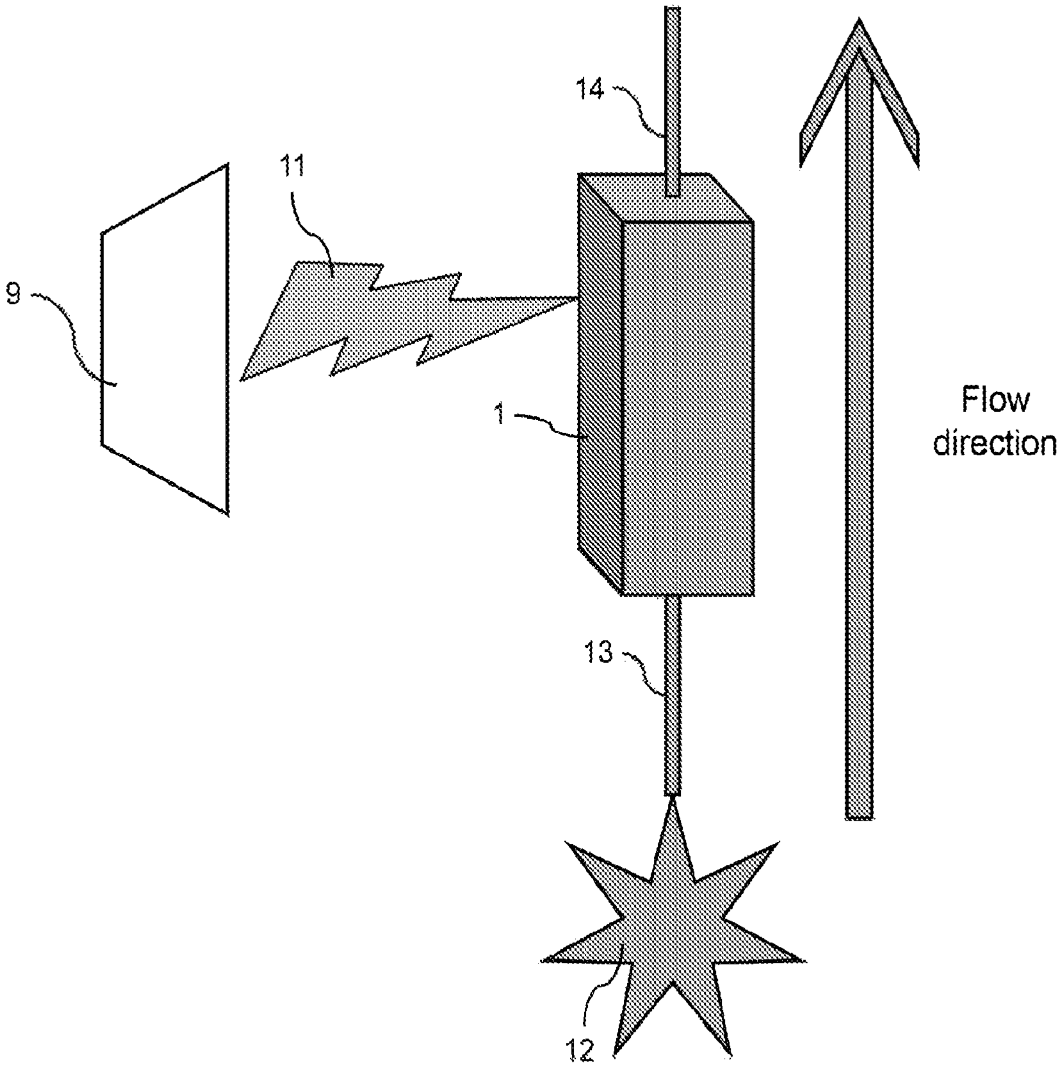
FIG. 8 is a schematic of a continuous flow system for processing hydrocarbon from source 12 into liquid fuel according to various potential embodiments.

In some embodiments, reactor 1 may include one or more valves or ports not shown in FIG. 1. Said valves or ports may be configured with input and out lines. The input and out lines may be configured to convey liquid fuel products away from reactor 1. In some embodiments, the input and out lines are configured to deliver additional hydrocarbon and/or additives, or crosslinking promotors. In some embodiments input lines may be configured to add alkane, alkyne or alkene, of a greater carbon number than the hydrocarbon irradiated in reactor 1. In some embodiments a continuous flow system includes the apparatus of the invention. Referring to FIG. 8, in some embodiments of the continuous flow system, input line 13 is configured to convey hydrocarbon (i.e., natural gas) from hydrocarbon source 12 (i.e., natural gas well or crude gas well) to reactor 1. Out line 14 may be configured to convey liquid fuel product out of reactor 1.

Figure 10:
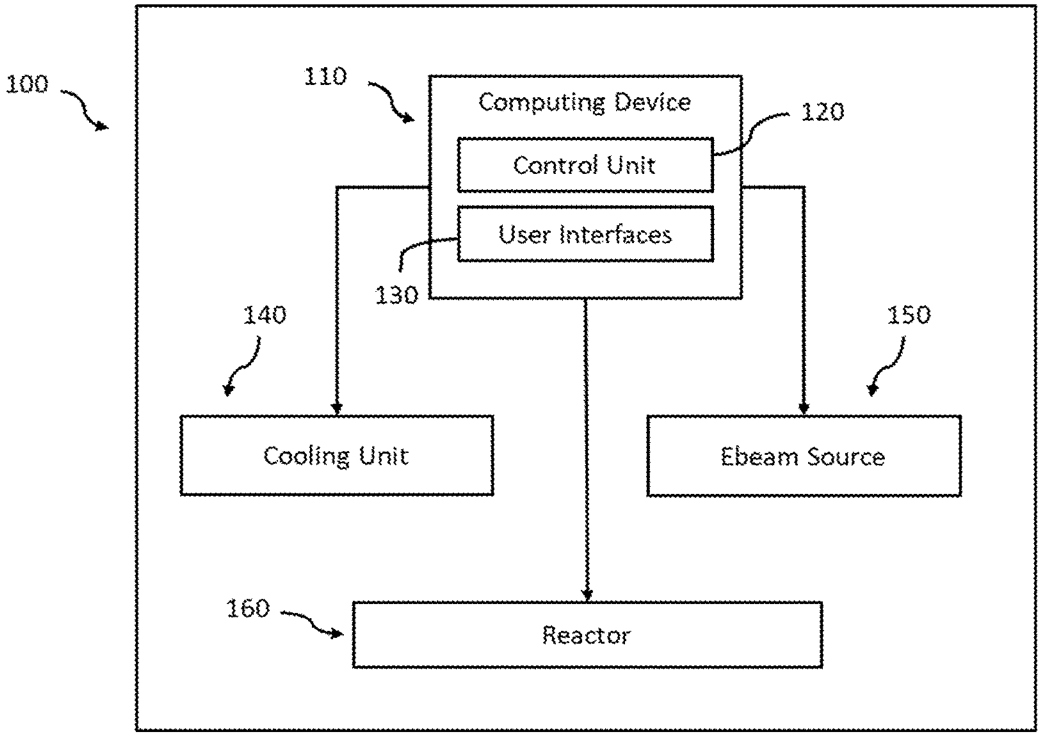
FIG. 10 depicts an illustrative system for control of cooling, irradiation, and flow of hydrocarbons in a reactor according to various potential embodiments.

FIG. 10 is a schematic illustrative of an example system 100 with a computing device 110 having a control/processing unit 120 and user interfaces 130 (e.g., input devices such as a keyboard, microphone, and/or touchscreen, and output devices such as a display screen and speaker), the computing device 110 communicatively coupled to and in control of a cooling unit 140, an ebeam source 150, and a reactor 160, according to various potential embodiments. The control unit 120 is capable of sending control signals to the cooling unit 140 to affect the temperature of hydrocarbons in the reactor 160. The control unit 120 is also capable of sending control signals to the ebeam source 150 to irradiate hydrocarbons in the reactor 160. And the control unit 120 is capable of sending control signals to the reactor 160 to, for example, control valves thereof to control, for example, the flow of hydrocarbons into the reactor 160 and liquid fuel out of the reactor 160. Computing device 110 is able to receive user inputs through user interfaces 130 and control the components of system 100 based on the user inputs.

Definitions

As used herein and in the claims, the singular forms "a," "an," and "the" include the plural reference unless the context clearly indicates otherwise. Throughout this specification, unless otherwise indicated, "comprise," "comprises" and "comprising" are used inclusively rather than exclusively. The term "or" is inclusive unless modified, for example, by "either." Thus, unless context or an express statement indicates otherwise, the word "or" means any one member of a particular list and also includes any combination of members of that list. Other than in the examples, or where otherwise indicated, all numbers expressing quantities of ingredients or reaction conditions used herein should be understood as modified in all instances by the term "about."

Headings are provided for convenience only and are not to be construed to limit the invention in any way. Unless defined otherwise, all technical and scientific terms used herein have the same meaning as those commonly understood to one of ordinary skill in the art. The terminology used herein is for the purpose of describing particular embodiments only and is not intended to limit the scope of the present invention, which is defined solely by the claims. In order that the present disclosure can be more readily understood, certain terms are first defined. Additional definitions All numerical designations, e.g., pH, temperature, time, concentration, and molecular weight, including ranges, are approximations which are varied (+) or (−) by increments of 1, 5, or 10%. It is to be understood, although not always explicitly stated that all numerical designations are preceded by the term "about." It also is to be understood, although not always explicitly stated, that the reagents described herein are merely exemplary and that equivalents of such are known in the art and are set forth throughout the detailed description.

As used herein, the term "comprising" or "comprises" is intended to mean that the compositions and methods include the recited elements, but not excluding others. "Consisting essentially of" when used to define compositions and methods, shall mean excluding other elements of any essential significance to the combination for the stated purpose. Thus, a composition consisting essentially of the elements as defined herein would not exclude other materials or steps that do not materially affect the basic and novel characteristic(s) of the claimed invention. "Consisting of" shall mean excluding more than trace elements of other ingredients and substantial method steps. Embodiments defined by each of these transition terms are within the scope of this invention. When an embodiment is defined by one of these terms (e.g., "comprising") it should be understood that this disclosure also includes alternative embodiments, such as "consisting essentially of" and "consisting of" for said embodiment.

"Substantially" or "essentially" means nearly totally or completely, for instance, 95%, 96%, 97%, 98%, 99%, or greater of some given quantity.

The term "about" will be understood by persons of ordinary skill in the art and will vary to some extent depending upon the context in which it is used. If there are uses of the term which are not clear to persons of ordinary skill in the art given the context in which it is used, "about" will mean up to plus or minus 10% of the particular term. For example, in some embodiments, it will mean plus or minus 5% of the particular term. Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number, which, in the context in which it is presented, provides the substantial equivalent of the specifically recited number.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the disclosure.

As used herein, the term "treatment" or "treating" means treatment of hydrocarbon with electron beam.

A non-limiting example experimental setup is provided in the Examples section, below, to illustrate potential embodiments of the disclosed method and apparatus and various features and advantages thereof.

Although the foregoing refers to particular preferred embodiments, it will be understood that the present invention is not so limited. It will occur to those of ordinary skill in the art that various modifications may be made to the disclosed embodiments and that such modifications are intended to be within the scope of the present invention.

All of the publications, patent applications and patents cited in this specification are incorporated herein by reference in their entirety.

EXAMPLES

Example 1: Formation of Liquid Fuels from Pentane

Experimental Method and Setup

Figure 2A:
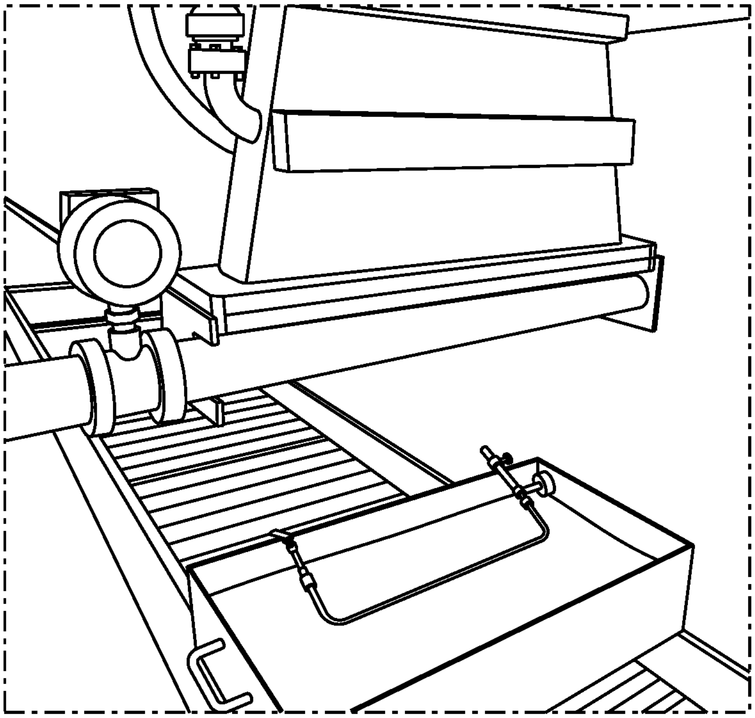
FIG. 2 is a photograph of an example apparatus used to irradiate hydrocarbons (FIG. 2A) including the reactor (FIG. 2B) according to various potential embodiments.
Figure 2B:
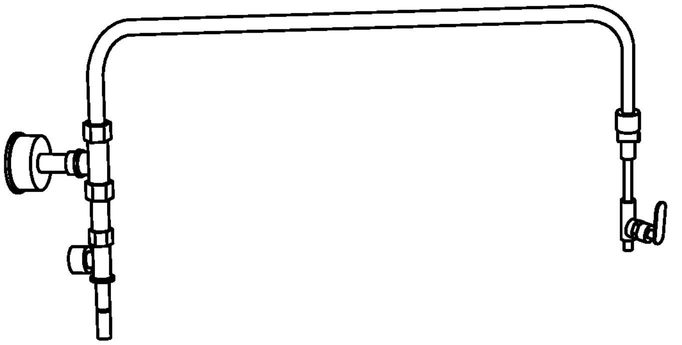

Experiments were conducted with the setup shown below in FIG. 2. The reactor was made of ½ inch aluminum tubes with thin wall. The length of the tube is the same as the beam length which is 20 inches. Tube was sealed with a ball valve on one side and a pressure relief valve on the other side. One pressure gage was used to ensure a better sealing quality of the system. Before the ebeam test, pressure check was performed with argon gas and system was able to hold the pressure at 45 psi for more than ten hours. Pressure relief values setting point was 50 psi.

After pentane samples was loaded into the reaction tube, trapped air needs to be removed from the system in order to avoid any flame or explosion caused by air-hydrocarbon reactions. To achieve this, argon was used to purge the system and after the purge trapped air concentration was below 0.01%. System was first pressurized by argon to 45 psi, then release the pressure to 5 psi and close the ball valve. This was repeated five times. Reactor with sample was weighed before and after the test.

Since samples needs to be irradiated at a condensed states for better results. This was achieved by irradiating the sample at low temperature to prevent phase change and pressure increase. Ice water bath was used to provide the desired cooling on the reactor. Ice water bath was inside a stainless steel container and a water pump helped move the water to increase the heat transfer coefficient. During the irradiation experiment, reactor was submerged into the ice water bath. Specific energy input (SEI) was also controlled by controlling the irradiation time. Only low (SEI) is the interest of this research to maximize the economic viability of this process. Characterizations techniques such as GC-FID, GC-MS, FTIR and TGA will be used to study the irradiation effect. Mass balance was performed to determine the experiment uncertainly.

Figure 3:
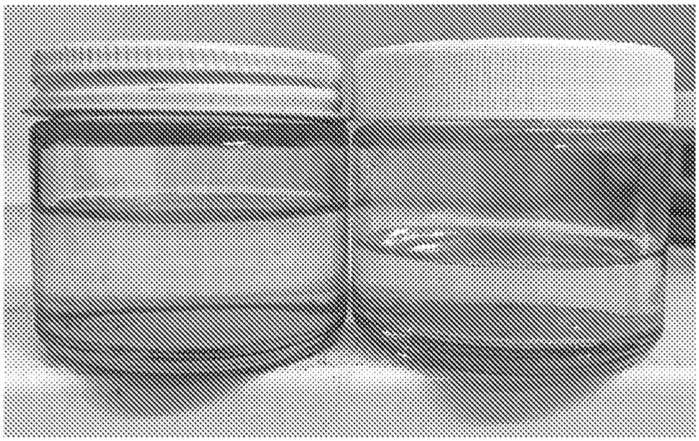
FIG. 3A shows an image of pentane samples untreated (left) and post processing (right) according to various potential embodiments.
FIG. 3B shows temperature profiles during irradiation of the water bath temperature and the reactor wall temperature according to various potential embodiments.
Figure 3:
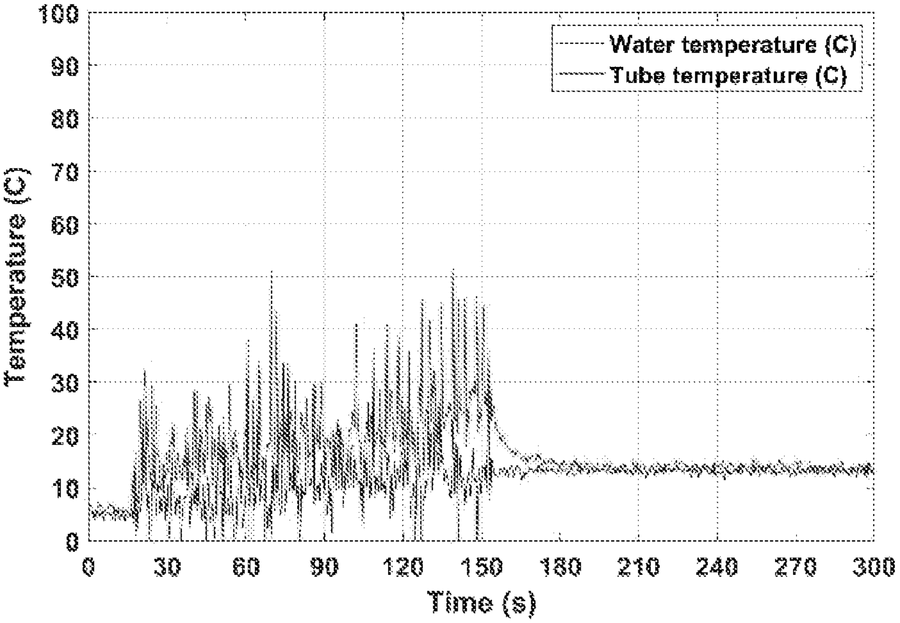

Experimental conditions achieved with this setup were shown in table 1. An image of the samples untreated and post processing are shows in FIG. 3A. There is no significant color change between the raw and treated sample.

TABLE 1

Experimental and Irradiation Conditions

| Samples | Temperature (C.) | Initial pressure (psi) | End Pressure (psi) | SEI (kJ/kg) | Duration (s) | Dose rate (kGy/s) | Cooling |
|---|---|---|---|---|---|---|---|
| Pentane | 10-25 | 14 | <50 | 300-350 | 140 | 4.5 | Yes |

Processing Temperature

Temperatures were measured from two locations to increase accuracy and reliability. One was in water and the other on the reactor wall. Temperature profiles were shown in FIG. 3. Temperatures were able to be read and written in this high radiation identity environment except significant noise was recorded on both signals. Overall samples were irradiated in the temperature range of 5 to 20° C. This temperature range is below the boiling temperatures of pentane. It indicates that irradiation of samples occurred at liquid state with high number density.

Mass Balance

As usual, mass balance after test was calculated and reported in table 2. Here mass balance results only shown the weight change from the sample and assume the weight of the reactor is constant. Mass change after the experiment may be due to two reasons. Gaseous species including hydrogen, methane, ethane and all other small molecules were produced in the process and slowly released into the ambient (through small leaks), which caused part of the weight loss. The other possibility is that pressure inside the reactor was too high and forced the relief valve to open. In both cases the lost species will result in a total mass loss to the sample. Those species will not be analyzed by either GC-FID or TGA but they should be included in the production of small products. This experiment only focuses on characterizing the left liquid samples and leaves the analysis of gaseous species for future work.

TABLE 2 mass balance results of pentane

| Samples | Treated mass (g) | Mass left (g) | Balance (%) | Mass loss (g) | Mass loss (%) |
|---|---|---|---|---|---|
| Pentane | 15.00 | 14.63 | 97.53% | 0.37 | 2.87% |

Conversion Analysis

Figure 4:
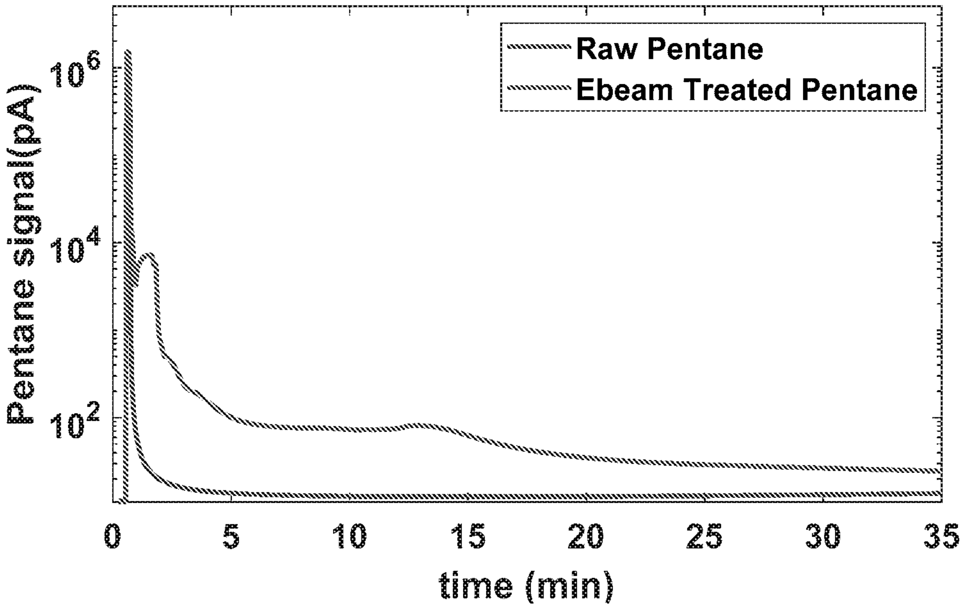
FIG. 4A shows GC-FID signal difference between raw pentane (bottom line) and irradiated (treated) pentane (top line) according to various potential embodiments.
FIG. 4B shows sample signal as a function of carbon number for the raw pentane (bottom line) and irradiated pentane (top line) according to various potential embodiments.
FIG. 4C shows mass recovery as a function of time according to various potential embodiments.
FIG. 4D is a conversion plot that shows the both the reduction of original species (pentane) and production of new species according to various potential embodiments.
Figure 4:
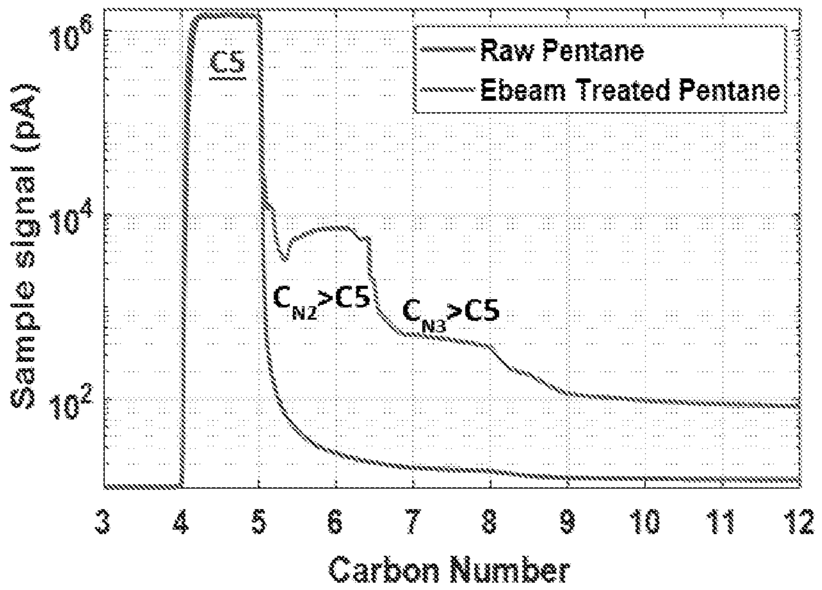
Figure 4:
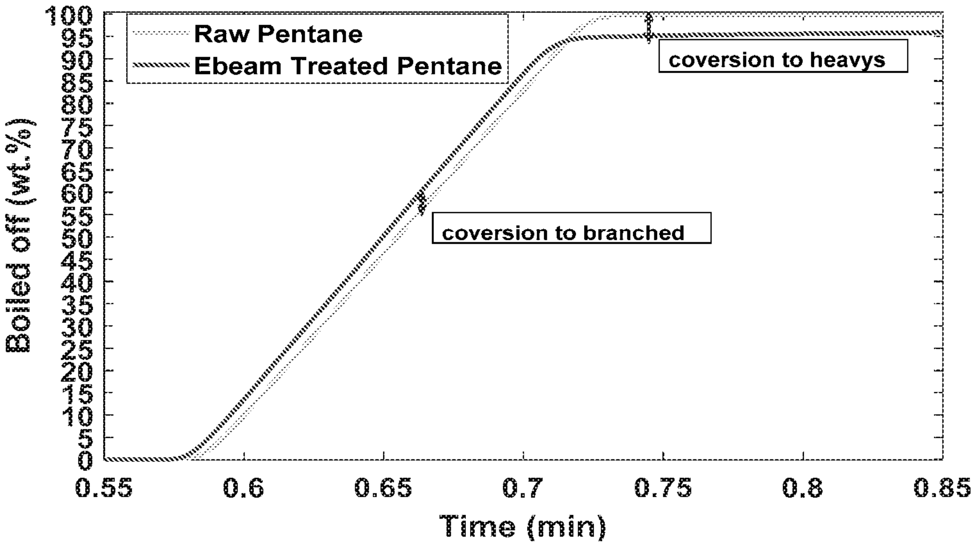
Figure 4:
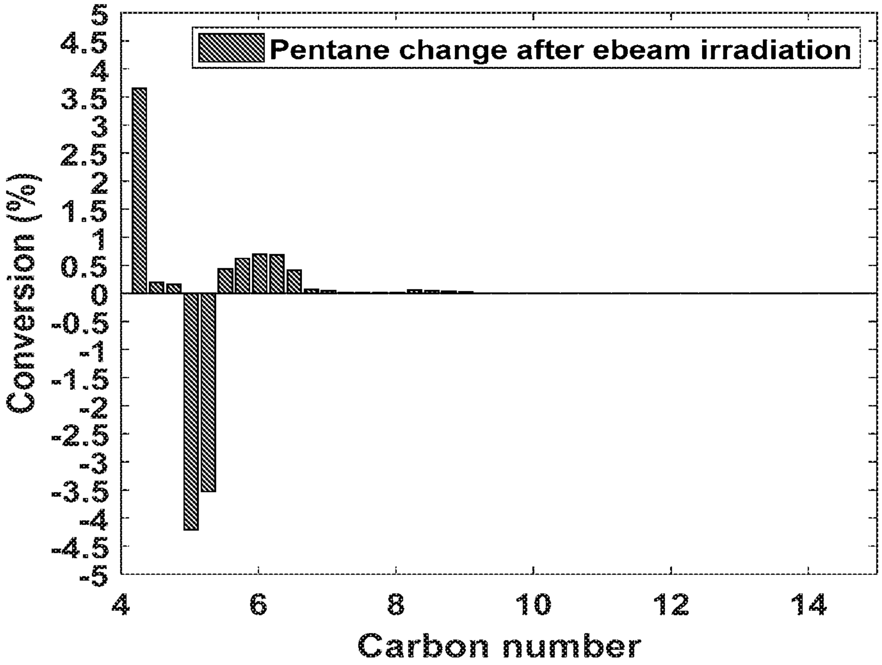

GC-FID analysis was performed to analyze pentane conversion after ebeam irradiation. FIG. 4 shows the signals difference between raw pentane and treated pentane. Raw pentane shows one major peak that corresponds to C5. The signal of treated pentane shows very different behavior. Signal strength corresponding to C5 is weaker but the rest of the signal is higher than that of raw pentane. This is due to the conversion of C5 to other hydrocarbons. A plot (b) with carbon number was created with the raw signal. Carbons larger than C5 were clearly seen on this plot. In particular there are three distinctive regions on the product distribution. Those three regions might represent three different type of products produced by irradiation of pentane. One plot that represents mass recovery as a function of time was created in (c). There are two important findings from this plot. Treated sample mass recovery only reached 95% after 0.72 minutes compared to 100% recovery of raw Pentane sample.

This demonstrates that there are about 5% hydrocarbons species that are heavier than pentane and couldn't leave the GC system. The other important thing is that treated sample recovered faster by about 4%. This indicates the existence of hydrocarbons that are lighter than pentane, which might be branched hydrocarbons such as iso-pentane. The last plot (d) is a conversion plot that shows the both the reduction of original species (pentane) and production of new species. More than 8% pentane was conversed to new hydrocarbon species. Among all the products created in this process, about 4% is heavy species that are larger than C5 and the rest of them light species.

Figure 5:
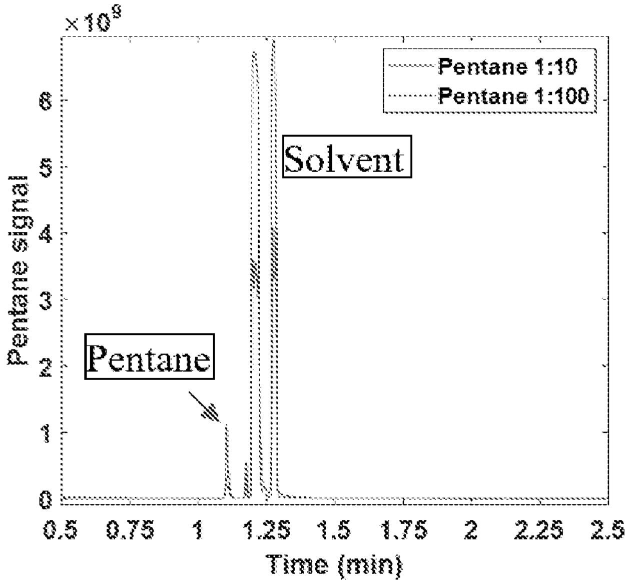
FIGS. 5A and 5B are GCMS spectra of irradiated pentane at 1:10 and 1:100 ratios of pentane dilution according to various potential embodiments.
Figure 5:
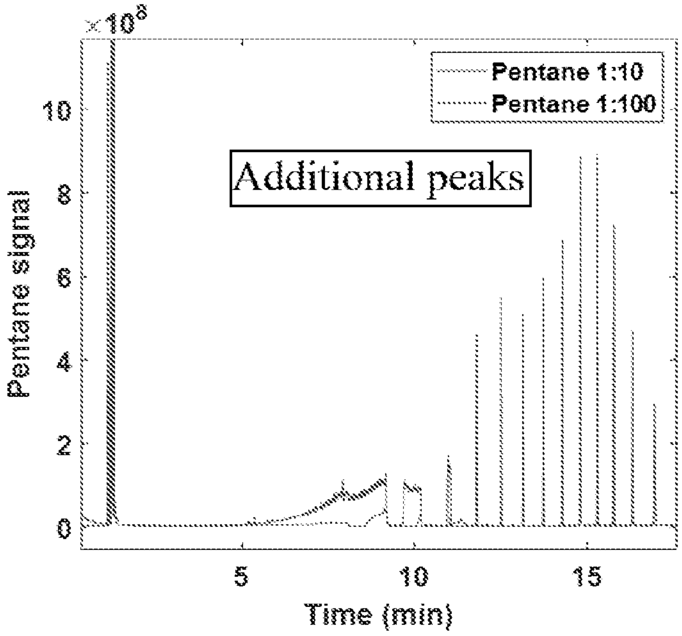

GC-MS was also used to study the new hydrocarbon compounds that are created in the irradiation process. FIG. 5 shows the GC-MS spectra of irradiated pentane. Experiments were done with two dilution ratios (10 and 100) to better resolve the signal. Pentane signal appeared at 1.1 minutes followed by another two peaks which correspond to the solvent. FIG. 5A shows the untreated pentane which only exhibits the raw pentane and solvent peak. FIG. 5B shows the treated pentane. Many additional peaks were observed in treated pentane. Those peaks are not present in raw pentane and are attributed to hydrocarbons synthesized in the treatment of the sample. Unfortunately the GC-MS column used in this experiment is reactive with the new hydrocarbon sample. Each of those peaks is a combination of hydrocarbon from the sample and polysilane from the GC column wall. Those peaks are typically seen with water molecules or acids because they possess stronger polarity and are able to remove materials from the column wall. Normal straight chain alkanes have dipole moments <0.01. Cyclic structures with branches (e.g. Ethylbenzene) have larger dipole moments (e.g. 0.5 for ethylbenzene). Some of these structures are thus more reactive with this type of GC column. In FIG. 5B based upon the elution times of the molecules, there carbon numbers are in the $C_5$-$C_{23}$ range.

Figure 7:
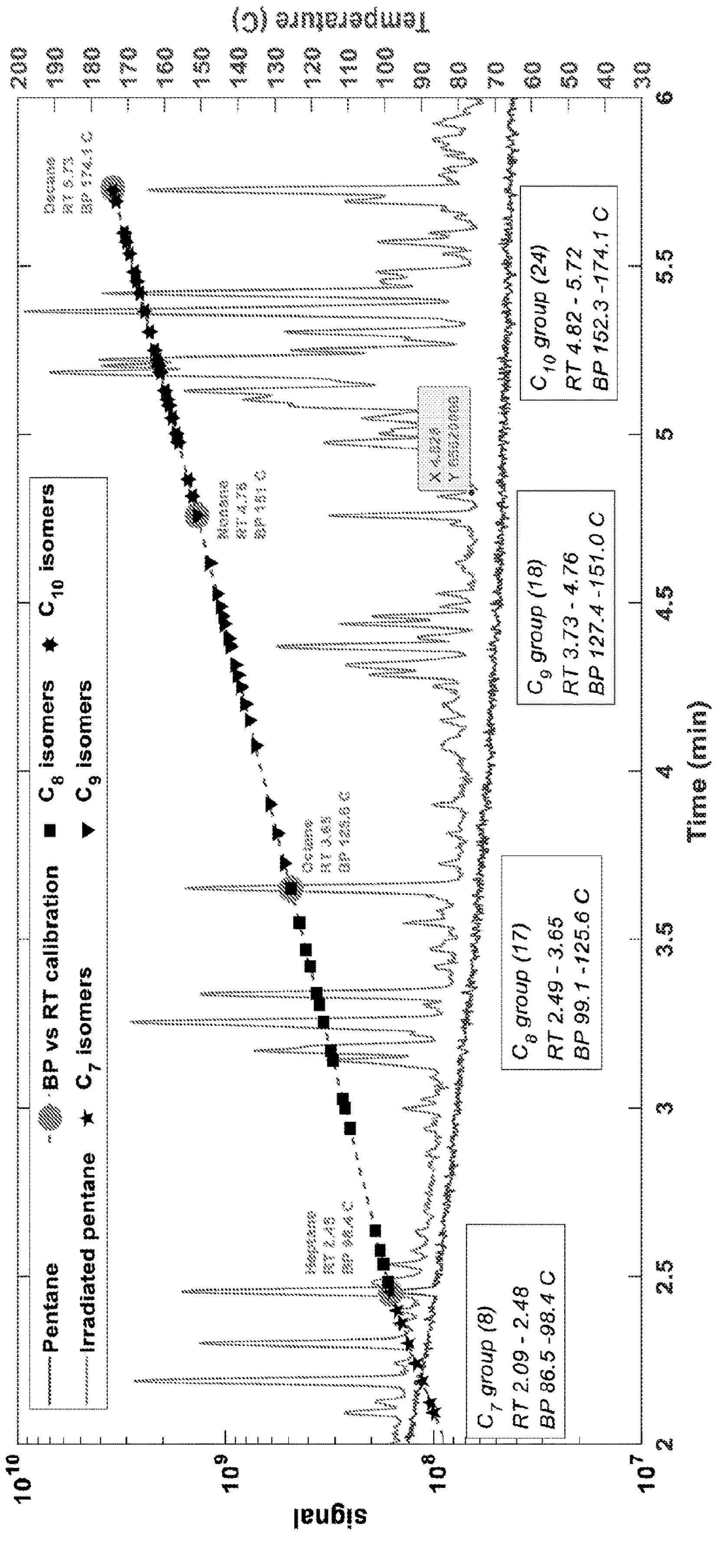
FIG. 7 shows a GC-MS chromatogram of the reactor contents as a function of time according to various potential embodiments.

Products were reanalyzed using a GC-MS with less reactive GC column and are shown in FIG. 7. This figures shows $C_7$, $C_8$, $C_9$, and $C_{10}$ length hydrocarbons produced from a $C_5$ feed. Furthermore, the majority of the product is $C_{10}$ an N=2 chain of the precursor. Furthermore, multiple isomers of the various carbon compounds are shown. Not only is cross linking occurring but a variety of iso-polymerization of small alkanes are formed and induced by the high dose rate electron beam irradiation. Isomers and branched species are visible in the spectra. Such species would contribute to make the fuel higher octane and higher value as a liquid fuel. The iso-paraffin concentration among all products from treating pentane is close to 85%.

Figure 6:
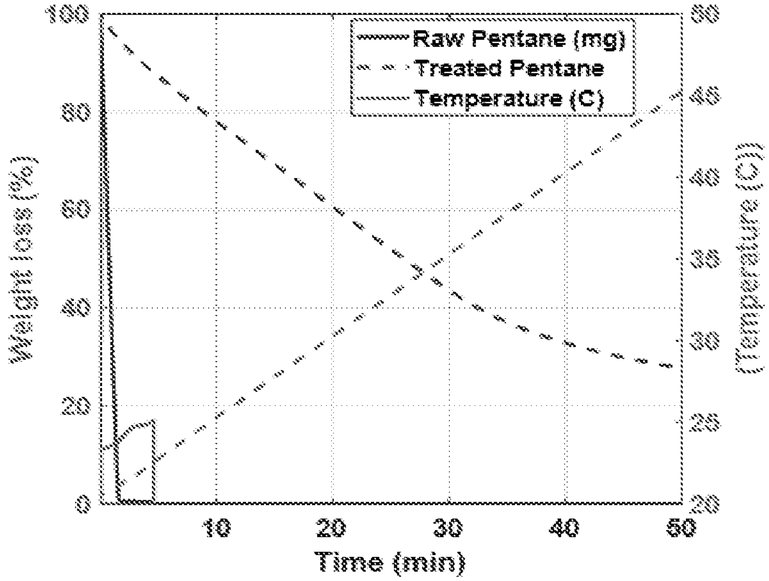
FIG. 6A shows weight loss over time of irradiated and raw pentane according to various potential embodiments.
FIG. 6B shows weight loss over time of pentane according to various potential embodiments.
Figure 6:
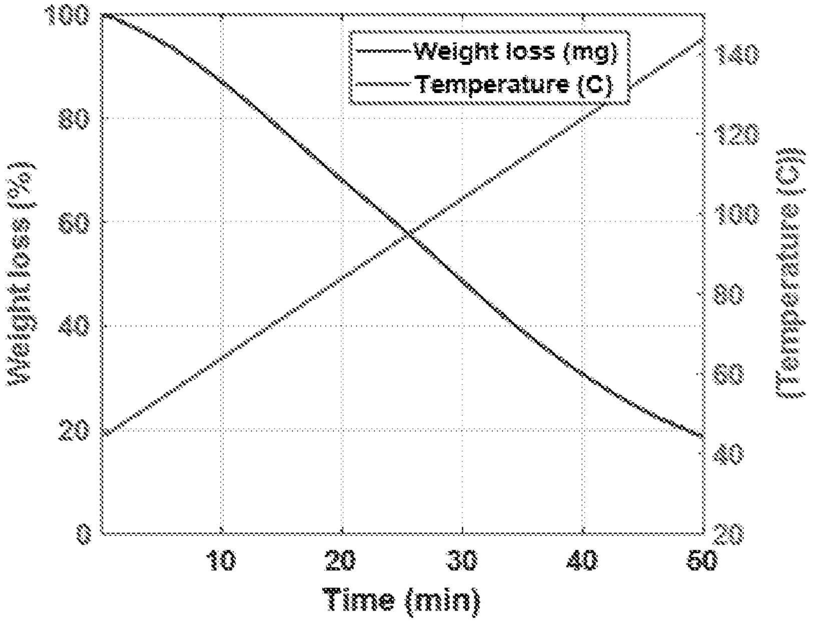

To further quantify the compounds change in the treated sample, thermal gravimetric analysis (TGA) was conducted on both the raw and treated pentane. TGA provides weight loss of the sample as a function of time or temperature. It allows for a larger sample weight in the range of 10-50 mg. Any solids present in treated liquids will also be detected. Weight loss for both were shown in FIG. 6A. Weight loss of raw pentane since it is a single component was very fast and 100% weight loss only took 1.5 minutes. The weight loss of treated pentane, however is dramatically different. Only 75% of its weight was lost in 50 minutes up to 45° C. Experiment time was extended for another 50 minutes and to 140° C. to further analyze heavy species in treated sample. Results were shown in FIG. 6B. There was still 4% (20% of the remaining 25%) hydrocarbons with boiling point greater than 140° C. after 50 minutes.

Irradiation of Natural Gas in GTL Process

It has been experimentally proved that high energy electron beam irradiation of small hydrocarbon compounds produces larger molecules with high yields. This definitely pushes the boundary of hydrocarbons that could be irradiated to produce products for different applications. Natural gas, one of the cleanest and abundant fossil fuel has lower carbon emissions and less impurities compared to other fuels. However, its market share among all energy resources has never been able to match its reserves and quality due to poor transportability and safety concerns. This might be addressed by converting natural gas into high-quality liquid products (GTL) such as gasoline and diesel fuel through a similar process. It has very profound and broad impact on the energy industry. If natural gas could be successfully converted to high octane gasoline in a cost effective manner, it will help transform the energy industry and save billions of dollars for our country and society.

Example 2: Liquid Fuels from Natural Gas

Currently natural gasses are routinely cryogenically liquefied (called Liquefied Natural Gas—LNG) to ease transportation but this liquefaction is temporary. Permanently converting gaseous naturally occurring hydrocarbons (e.g. methane, ethane, propane, and butane) to liquids fuels would greatly improve their transportability. This process is referred to as Gas to Liquids (GTL). Such chemical conversion can occur through a crosslinking process. For natural gas crosslinking to chain length of N=2 to N=5 would produce condensed liquids at ambient temperatures and pressures. Irradiation of hydrocarbons is a known process to crosslink monomers. However, for the processing of light hydrocarbons, literature shows this to be very inefficient. With the majority of yield in irradiation of natural gas being crack products not cross link products. An irradiation method disclosed herein increases the yield and efficiency of light hydrocarbon crosslinking process. This is done by irradiating the natural gas in a high density state. The natural gas could be at high pressure or low temperate (or a combination of both) to bring the density to levels comparable with the liquid or solid density. The present processing permanently converts the natural gas to a liquid by irradiation chemistry. During irradiation, radicals are generated and a polymerization chain reaction is initiated. One radical can lead to several chain formations. Depending on the processing states and the addition of promoters, the conversion can vary significantly. Irradiation at high density is unique in that the radical species is very short lived and will react with neutral species prior to being further excited. In low density processing multiple excitations would lead to excessive decomposition, carbon nucleation, and yield of nano- and micro-particulate formation. Irradiation of natural gas at high density helps to significantly increase the probability of radical induced reactions which leads to increased conversion to liquid products. For the condensed hydrocarbon, conversions it will be highest when above the glass transition temperature and best when above the melting temperature but below the boiling temperature. The processing states thus must be carefully selected but will only have the most beneficial effects when combined with the use of additives and a narrow range of energy input. This method of gas to liquid conversion process by high energy electron beam irradiation is applicable to natural gas conversion to liquid fuels facilitating transportation and the product can also be used to produce diluent to help with heavy crude oil transportation.

Unlike irradiation of mineral oils and pentane which are at liquid state during the irradiation experiments, irradiation of natural gas will be much more challenging and might encounter unprecedented issues related to process control and safety. First of all, natural gas is at gas state with extremely low density (0.7-0.9 kg/$m^3$) at ambient conditions. The density of most liquid hydrocarbons including mineral oil and pentane is three orders of magnitudes higher than that. This dramatic density difference limits the application of ebeam for irradiation of natural gas, because ebeam irradiation of materials is a volumetric method which will require tremendous volume flow rates in order to achieve a throughput at industrial scales. Natural gas could be liquefied before being irradiated. For example, methane will become liquid at temperature below −161° C. and start freezing at −182° C. Irradiation experiments could be operated in this narrow window when natural gas is at its liquid state. There might be additional challenges associated with irradiating natural gas in a very narrow operation window (−182° C. to 161° C.).

Experimental setup for irradiating natural gas will resemble the one used for irradiation of pentane but with several modifications to cope with thermodynamic difference between those two hydrocarbons. Natural gas has to be liquefied first before being irradiated. For lab scale test, liquefaction of natural gas could be achieved by contacting with liquid nitrogen in a closed system. Transporting the sample to ebeam facility will also require the use of liquid nitrogen. A liquid nitrogen bath similar as ice water bath could be deployed for both transportation process and for the irradiation experiment. Pressure relief valve and pressure gage needs to be upgraded for higher ratings to match natural gas pressure increase during the irradiation process. For industrial scale operation of this process, many optimizations on each component of the overall process need to be conducted, e.g. the liquefaction process could be completed in a separate plant which works the same way as a commercial LNG plan. High energy electron beam facility could be another separate unit. This facility should be built in a way that match the requirements of the production rate and power of the GTL process. Conceivably, the electron beam facility could be located near a well and real time convert natural gas to gasoline range fuels. The produced products could also be used as diluent to mix with crude oils and help meet the pipeline specs before transportation.

For the purposes of this disclosure and unless otherwise specified, “a” or “an” means “one or more.”

As used herein, “about” will be understood by persons of ordinary skill in the art and will vary to some extent depending upon the context in which it is used. If there are uses of the term which are not clear to persons of ordinary skill in the art, given the context in which it is used, “about” will mean up to plus or minus 10% of the particular term.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The embodiments, illustratively described herein may suitably be practiced in the absence of any element or elements, limitation or limitations, not specifically disclosed herein. Thus, for example, the terms ‘comprising,’ ‘including,’ ‘containing,’ etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase ‘consisting essentially of’ will be understood to include those elements specifically recited and those additional elements that do not materially affect the basic and novel characteristics of the claimed technology. The phrase ‘consisting of’ excludes any element not specified.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent compositions, apparatuses, and processes within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular processes, reagents, compounds compositions or biological systems, which can, of course, vary. It is also to be understood that the terminology used herein is for the purpose of describing particular embodiments only, and is not intended to be limiting.

“Psig” stands for pounds per square in gauge.

“Liquid fuel” may refer to any hydrocarbon of greater carbon number than the hydrocarbon introduced to the reactor of the present invention for processing by ebeam irradiation.

“Cooling unit” The cooling unit may include a water or air cooled bath to prevent the feed stock from overheating and maintaining an appropriate density during processing. The cooling could also include thermoelectric cooling or refrigerant cooling. Joules Thompson expansion processes could also be used on the feedstock upstream of the reactor to sub-cool it in the pre-processing. Cryogenic circulants like liquid nitrogen or liquid argon could also be used to cool the unit and feed stock. These could be supplied by a separate coolant liquefier unit.

“Ambient” or standard temperature and pressure (STP) is defined as a temperature of 273.15 K (0° C., 32° F.) and an absolute pressure of exactly 105 Pa (100 kPa, 1 bar). “Cryogenic” temperatures may, in various embodiments, be approximately −150° C. or lower.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as ‘up to,’ ‘at least,’ ‘greater than,’ ‘less than,’ and the like, include the number recited and refer to ranges which can be subsequently broken down into sub-ranges as discussed above. Finally, as will be understood by one skilled in the art, a range includes each individual member.

"Natural source" or simply "source" of a natural gas or hydrocarbon may refer to a mine, a coal bed, a well, a methane clathrate, shale, bacteria, and animals.

While certain embodiments have been illustrated and described, it should be understood that changes and modifications can be made therein in accordance with ordinary skill in the art without departing from the technology in its broader aspects as defined in the following lettered paragraphs and claims.

The present technology may include, but is not limited to, the features and combinations of features recited in the following lettered paragraphs, it being understood that the following paragraphs should not be interpreted as limiting the scope of the claims as appended hereto or mandating that all such features must necessarily be included in such claims:

A. A method for converting a hydrocarbon into a liquid fuel, the method comprising irradiating the hydrocarbon with an electron beam.

B. A method of transporting a hydrocarbon, comprising irradiating the hydrocarbon with an electron beam to form a liquid fuel.

C. The method of paragraph A or B, wherein the hydrocarbon comprises natural gas and the irradiating is performed at a natural source of the natural gas.

D. The method of any one of paragraphs A-C, further comprising conveying the liquid fuel away from the natural source.

E. The method of any one of paragraphs A-D, wherein the hydrocarbon comprises methane, ethane, $C_3$ alkanes, $C_4$ alkanes, $C_5$ alkanes, $C_6$ alkanes, $C_7$ alkanes, ethene, $C_3$ alkenes, $C_4$ alkenes, $C_5$ alkenes, $C_6$ alkenes, $C_7$ alkenes, ethyne, $C_3$ alkynes, $C_4$ alkynes, $C_5$ alkynes, $C_6$ alkynes, $C_7$ alkynes, or a combination thereof.

F. The method of any one of paragraphs A-E, wherein the liquid fuel comprises $C_3$ alkanes, alkenes, or alkynes; $C_4$ alkanes, alkenes, or alkynes; $C_5$ alkanes, alkenes, or alkynes;

$C_6$ alkanes, alkenes, or alkynes; $C_7$ alkanes, alkenes, or alkynes; $C_8$ alkanes, alkenes, or alkynes; $C_9$ alkanes, alkenes, or alkynes; $C_{10}$ alkanes, alkenes, or alkynes; $C_{11}$ alkanes, alkenes, or alkynes; $C_{12}$ alkanes, alkenes, or alkynes; or a combination thereof.

G. The method of any one of paragraphs A-F, wherein the liquid fuel comprises from about 1% to about 10%, about 10% to about 20%, about 20% to about 30%, about 30% to about 40%, about 40% to about 50%, about 50% to about 60%, about 60% to about 70%, about 80% to about 90%, or about 90% to about 99%, $C_5$-$C_8$ alkanes by weight.

H. The method of any one of paragraphs A-G, wherein the liquid fuel comprises from about 1% to about 10%, about 10% to about 20%, about 20% to about 30%, about 30% to about 40%, about 40% to about 50%, about 50% to about 60%, about 60% to about 70%, about 80% to about 90%, or about 90% to about 99%, $C_8$ alkanes by weight.

I. The method of any one of paragraphs A-H, wherein the liquid fuel comprises a branched alkane.

J. The method of any one of paragraphs A-I, wherein the liquid fuel comprises gasoline.

K. The method of any one of paragraphs A-J, wherein the liquid fuel comprises diesel fuel.

L. The method of any one of paragraphs A-K, wherein the hydrocarbon forms a radical upon irradiation.

M. The method of any one of paragraphs A-L, wherein the hydrocarbon is isomerized upon irradiation.

N. The method of any one of paragraphs A-M, wherein isomerization comprises chain isomerization, positional isomerization, functional isomerization, or stereoisomerization.

O. The method of any one of paragraphs A-N, wherein the hydrocarbon is polymerized upon irradiation.

P. The method of any one of paragraphs A-O, further comprising cooling the hydrocarbon prior to irradiation.

Q. The method of any one of paragraphs A-P, wherein the hydrocarbon is cooled to a temperature between its melting point and freezing point, prior to irradiation.

R. The method of any one of paragraphs A-Q, wherein the hydrocarbon is pressurized prior to irradiation.

S. The method of any one of paragraphs A-R, wherein the hydrocarbon is pressurized prior to irradiation to a pressure of about 1 psig to about 2 psig, about 2 psig to about 3 psig, about 3 psig to about 4 psig, about 4 psig to about 5 psig, about 5 psig to about 6 psig, about 6 psig to about 7 psig, about 8 psig to about 9 psig, about 9 psig to about 10 psig, or about greater than 10 psig.

T. The method of any one of paragraphs A-S, further comprising condensing the hydrocarbon to a liquid prior to irradiation.

U. The method of any one of paragraphs A-T, wherein the hydrocarbon comprises natural gas.

V. The method of any one of paragraphs A-U, wherein the hydrocarbon comprises liquefied natural gas.

W. The method of any one of paragraphs A-V, wherein the hydrocarbon comprises liquefied natural gas comprising methane and optionally one or more of ethane, $C_3$ alkanes, $C_4$ alkanes, carbon dioxide, nitrogen, hydrogen sulfide, and helium.

X. The method of any one of paragraphs A-W, wherein the hydrocarbon is irradiated below ambient temperature.

Y. The method of any one of paragraphs A-X, wherein the hydrocarbon is irradiated at a cryogenic temperature.

Z. The method of any one of paragraphs A-Y, wherein the irradiation is for about 1 s to about 20 s, about 20 s to about 40 s, about 40 s to about 60 s, about 60 s to about 80 s, about 80 s to about 100 s, about 100 s to about 120 s, about 120 s to about 140 s, about 140 s to about 160 s, about 160 s to about 180 s, about 180 s to about 200 s, about 200 s to about 250 s, about 250 s to about 300 s, or greater than about 300 s.

AA. The method of any one of paragraphs A-Z, wherein the electron beam comprises greater than about 500 keV, greater than about 400 keV, greater than about 300 keV, greater than about 200 keV, or greater than about 100 keV.

BB. The method of any one of paragraphs A-AA, wherein the electron beam is greater than about 5 MeV.

CC. The method of any one of paragraphs A-BB, wherein the electron beam is about 10 MeV.

DD. The method of any one of paragraphs A-CC, wherein the electron beam comprises a high-energy electron beam.

EE. The method of any one of paragraphs A-DD, wherein the electron beam comprises a dose rate of about 1 kGy/s to about 2 kGy/s, about 2 kGy/s to about 3 kGy/s, about 3 kGy/s to about 4 kGy/s, about 4 kGy/s to about 5 kGy/s, about 5 kGy/s to about 6 kGy/s, about 6 kGy/s to about 7 kGy/s, about 7 kGy/s to about 8 kGy/s, or greater than about 8 kGy/s.

FF. The method of any one of paragraphs A-EE, wherein an electron beam source comprising a linear accelerator (LINAC) delivers the electron beam.

GG. The method of any one of paragraphs A-FF, wherein the electron beam comprises an energy source comprising solar, wind, rain, tide, wave, hydropower, or geothermal energy, or a combination thereof.

HH. The method of any one of paragraphs A-GG, wherein the method comprises permanent conversion of a hydrocarbon gas to the liquid fuel.

II. The method of any one of paragraphs A-HH, wherein the method is performed on scale of hydrocarbon selected from about 1 g to about 10 g, about 10 g to about 100 g, about 100 g to about 1 kg, about 1 kg to about 100 kg, about 100 kg to about 1 metric ton (mt), about 1 mt to about 10 mt, about 10 mt to about 100 mt, and greater than about 100 mt.

JJ. An apparatus for converting a hydrocarbon into a liquid fuel, the apparatus comprising:

a reactor for containing the hydrocarbon to be converted to the liquid fuel; and an electron beam source configured to irradiate the hydrocarbon in the reactor with an electron beam.

KK. The apparatus of paragraph JJ, further comprising a cooling unit configured to cool the hydrocarbon in the reactor.

LL. The apparatus of paragraph KK, wherein the cooling unit comprises a cooling bath comprising a solvent.

MM. The apparatus of paragraph LL, the solvent comprising acetone, dry ice, water, ethanol, liquid $N_2$, ethyl acetate, butanol, ethylene glycol, methanol, xylene, dioxane, cyclohexane, benzene, formamide, salts, cycloheptane, benzyl alcohol, carbon tetrachloride, 1,3-dichlorobenzene, m-toluidine, acetonitrile, pyridine, octane, isopropyl ether, hexane, toluene, cyclohexene, pentane, and any combinations thereof.

NN. The apparatus of any one of paragraphs JJ-MM, the reactor comprising aluminum or other low density material acting as interface between the electron beam source and the processing chamber.

Other embodiments are set forth in the following claims, along with the full scope of equivalents to which such claims are entitled.

What is claimed is:

1. A method for converting one or more hydrocarbons into one or more liquid fuels, the method comprising:

condensing a hydrocarbon to obtain a condensed hydrocarbon; and irradiating the condensed hydrocarbon with an electron beam to produce a liquid fuel.

2. The method of claim 1, wherein the hydrocarbon comprises natural gas and the irradiating is performed at a natural source of the natural gas.

3. The method of claim 1, wherein the hydrocarbon comprises methane, ethane, $C_3$ alkanes, $C_4$ alkanes, $C_5$ alkanes, $C_6$ alkanes, $C_7$ alkanes, ethene, $C_3$ alkenes, $C_4$ alkenes, $C_5$ alkenes, $C_6$ alkenes, $C_7$ alkenes, ethyne, $C_3$ alkynes, $C_4$ alkynes, $C_5$ alkynes, $C_6$ alkynes, $C_7$ alkynes, or a combination thereof.

4. The method of claim 1, wherein the liquid fuel comprises $C_3$ alkanes, alkenes, or alkynes; $C_4$ alkanes, alkenes, or alkynes; $C_5$ alkanes, alkenes, or alkynes; $C_6$ alkanes, alkenes, or alkynes; $C_7$ alkanes, alkenes, or alkynes; $C_8$ alkanes, alkenes, or alkynes; $C_9$ alkanes, alkenes, or alkynes; $C_{10}$ alkanes, alkenes, or alkynes; $C_{11}$ alkanes, alkenes, or alkynes; $C_{12}$ alkanes, alkenes, or alkynes; or a combination thereof.

5. The method of claim 1, wherein the liquid fuel comprises a branched alkane or gasoline.

6. The method of claim 1, wherein the condensed hydrocarbon is polymerized upon irradiation.

7. The method of claim 1, further comprising cooling the hydrocarbon prior to irradiation.

8. The method of claim 1, wherein the hydrocarbon is pressurized prior to irradiation.

9. The method of claim 1, wherein the irradiation is for about 1 s to about 20 s, about 20 s to about 40 s, about 40 s to about 60 s, about 60 s to about 80 s, about 80 s to about 100 s, about 100 s to about 120 s, about 120 s to about 140 s, about 140 s to about 160 s, about 160 s to about 180 s, about 180 s to about 200 s, about 200 s to about 250 s, about 250 s to about 300 s, or greater than about 300 s.

10. The method of claim 1, wherein the electron beam is greater than about 5 MeV.

11. The method of claim 1, wherein the electron beam comprises a dose rate of about 1 kGy/s to about 2 kGy/s, about 2 kGy/s to about 3 kGy/s, about 3 kGy/s to about 4 kGy/s, about 4 kGy/s to about 5 kGy/s, about 5 kGy/s to about 6 kGy/s, about 6 kGy/s to about 7 kGy/s, about 7 kGy/s to about 8 kGy/s, or greater than about 8 kGy/s.

12. The method of claim 1, wherein an electron beam source comprising a linear accelerator (LINAC) delivers the electron beam.

13. The method of claim 1, wherein the electron beam comprises an energy source comprising solar, wind, rain, tide, wave, hydropower, or geothermal energy, or a combination thereof.

14. The method of claim 1, wherein the method converts the hydrocarbon that is gaseous at standard temperature and pressure (STP) to the liquid fuel that is liquid at STP, and wherein condensing the hydrocarbon comprises at least one of cooling and/or pressurizing the hydrocarbon that is gaseous at STP.

15. The method of claim 1, wherein the method is performed on a scale of hydrocarbon selected from about 1 g to about 10 g, about 10 g to about 100 g, about 100 g to about 1 kg, about 1 kg to about 100 kg, about 100 kg to about 1 metric ton (mt), about 1 mt to about 10 mt, about 10 mt to about 100 mt, and greater than about 100 mt.

16. The method of claim 1, wherein condensing the hydrocarbon comprises cooling and/or pressurizing the hydrocarbon, and wherein the electron beam is applied to the cooled and/or pressurized hydrocarbon during irradiation.

17. The method of claim 1, wherein the hydrocarbon is cooled to a temperature between its melting point and its boiling point, prior to irradiation.

18. The method of claim 1, further comprising adding a conversion promoter to the hydrocarbon or to the condensed hydrocarbon prior to or during irradiation to promote polymerization and/or crosslinking reactions.

19. The method of claim 1, wherein the hydrocarbon is gaseous at STP and the liquid fuel is liquid at STP, and wherein the method produces the liquid fuel at least in part through polymerization and/or crosslinking reactions promoted by irradiation.

20. The method of claim 1, wherein the hydrocarbon is gaseous at STP, wherein condensing the hydrocarbon comprises liquefying at least a portion of the hydrocarbon to obtain a liquefied hydrocarbon, wherein irradiating the condensed hydrocarbon comprises irradiating the liquefied hydrocarbon, and wherein the liquid fuel is liquid at STP.

* * * * *